(12) United States Patent
Cheng et al.

(10) Patent No.: US 12,055,249 B2
(45) Date of Patent: *Aug. 6, 2024

(54) AUTOMATIC FLUID FLOW SYSTEM WITH RETRACTABLE CONNECTION

(71) Applicant: C. R. Bard, Inc., Franklin Lakes, NJ (US)

(72) Inventors: Jason Jishen Cheng, Avondale Estates, GA (US); Rohit Sinha, Lawrenceville, GA (US); Michal Tourchak, Atlanta, GA (US)

(73) Assignee: C. R. Bard, Inc., Franklin Lakes, NJ (US)

( * ) Notice: Subject to any disclaimer, the term of this patent is extended or adjusted under 35 U.S.C. 154(b) by 331 days.

This patent is subject to a terminal disclaimer.

(21) Appl. No.: 17/373,546

(22) Filed: Jul. 12, 2021

(65) Prior Publication Data

US 2022/0026001 A1 Jan. 27, 2022

Related U.S. Application Data

(60) Provisional application No. 63/054,694, filed on Jul. 21, 2020.

(51) Int. Cl.
*F16L 37/12* (2006.01)
*G01G 17/04* (2006.01)

(52) U.S. Cl.
CPC .............. *F16L 37/12* (2013.01); *G01G 17/04* (2013.01)

(58) Field of Classification Search
None
See application file for complete search history.

(56) References Cited

U.S. PATENT DOCUMENTS 3,661,143 A 5/1972 Henkin
3,781,920 A 1/1974 Browne et al.
(Continued)

FOREIGN PATENT DOCUMENTS

CA 2882654 A1 10/2007
CN 2445749 Y 9/2001
(Continued)

OTHER PUBLICATIONS

Bard Medical, Criticore Disposables—Non I.C., 3 pages, www.bardmedical.com/products/patienl-moniloring-,ystems/criticore®-system/criticore®-disposables-non-ic/ Jan. 30, 2015.
(Continued)

*Primary Examiner* — Peter J Macchiarolo
*Assistant Examiner* — Jermaine L Jenkins
(74) *Attorney, Agent, or Firm* — Rutan & Tucker LLP (57) ABSTRACT

Embodiments disclosed herein are directed to apparatus and methods for automatic fluid flow system connectors. The system generally includes a load cell interface coupled to a console and a ring connector coupled to a fluid collection system. The ring connector can be releasably engaged with the load cell using a bayonet locking mechanism. One of the ring connector or the load cell can include a plate transitionable along a transverse axis between an engaged position and a disengaged as the ring connector rotates about a transverse axis. The plate can include electrical contacts configured to engage along the transverse axis and mitigate wear and damage to the electrical contacts, extending the usable life of the system.

19 Claims, 5 Drawing Sheets

(56) References Cited

U.S. PATENT DOCUMENTS

| | | | |
|---|---|---|---|
| 3,851,650 A | 12/1974 | Darling |
| 3,919,455 A | 11/1975 | Sigdell et al. |
| 4,276,889 A | 7/1981 | Kuntz et al. |
| 4,286,590 A | 9/1981 | Murase |
| 4,291,692 A | 9/1981 | Bowman et al. |
| 4,296,749 A | 10/1981 | Pontifex |
| 4,305,405 A | 12/1981 | Meisch |
| 4,312,352 A | 1/1982 | Meisch et al. |
| 4,343,316 A | 8/1982 | Jespersen |
| 4,443,219 A | 4/1984 | Meisch et al. |
| 4,448,207 A | 5/1984 | Parrish |
| 4,509,366 A | 4/1985 | Matsushita et al. |
| 4,532,936 A | 8/1985 | LeVeen et al. |
| 4,658,834 A | 4/1987 | Blankenship et al. |
| 4,723,950 A | 2/1988 | Lee |
| 4,834,706 A | 5/1989 | Beck et al. |
| 4,850,375 A | 7/1989 | Rosenberg |
| 4,889,532 A | 12/1989 | Metz et al. |
| 5,002,541 A | 3/1991 | Conkling et al. |
| 5,409,014 A | 4/1995 | Napoli et al. |
| 5,586,085 A | 12/1996 | Lichte |
| 5,725,515 A | 3/1998 | Propp |
| 5,733,319 A | 3/1998 | Neilson et al. |
| 5,738,656 A | 4/1998 | Wagner |
| 5,747,824 A | 5/1998 | Jung et al. |
| 5,769,087 A | 6/1998 | Westphal et al. |
| 5,807,278 A | 9/1998 | McRae |
| 5,823,972 A | 10/1998 | McRae |
| 5,891,051 A | 4/1999 | Han et al. |
| 5,911,786 A | 6/1999 | Nielsen et al. |
| 6,129,684 A | 10/2000 | Sippel et al. |
| 6,132,407 A | 10/2000 | Genese et al. |
| 6,250,152 B1 | 6/2001 | Klein et al. |
| 6,256,532 B1 | 7/2001 | Cha |
| 6,261,254 B1 | 7/2001 | Baron et al. |
| 6,434,418 B1 | 8/2002 | Neal et al. |
| 6,579,247 B1 | 6/2003 | Abramovitch et al. |
| 6,592,612 B1 | 7/2003 | Samson et al. |
| 6,709,420 B1 | 3/2004 | Lincoln et al. |
| 6,716,200 B2 | 4/2004 | Bracken et al. |
| 7,011,634 B2 | 3/2006 | Paasch et al. |
| 7,161,484 B2 | 1/2007 | Tsoukalis |
| 7,211,037 B2 * | 5/2007 | Briggs ............... A61M 1/3693 494/67 |
| 7,437,945 B1 | 10/2008 | Feller |
| 7,442,754 B2 | 10/2008 | Tepper et al. |
| 7,739,907 B2 | 6/2010 | Boiarski |
| 7,871,385 B2 | 1/2011 | Levinson |
| 7,931,630 B2 | 4/2011 | Nishtala et al. |
| 7,976,533 B2 | 7/2011 | Larsson |
| 7,998,126 B1 | 8/2011 | Fernandez |
| 8,295,933 B2 | 10/2012 | Gerber et al. |
| 8,328,733 B2 | 12/2012 | Forte et al. |
| 8,328,734 B2 | 12/2012 | Salvadori et al. |
| 8,337,476 B2 | 12/2012 | Greenwald et al. |
| 8,374,688 B2 | 2/2013 | Libbus et al. |
| 8,403,884 B2 | 3/2013 | Nishtala |
| 8,471,231 B2 | 6/2013 | Paz |
| 8,663,128 B2 | 3/2014 | Paz et al. |
| 8,773,259 B2 | 7/2014 | Judy et al. |
| 8,790,277 B2 | 7/2014 | Elliott et al. |
| 8,790,320 B2 | 7/2014 | Christensen |
| 8,790,577 B2 | 7/2014 | Mizumoto et al. |
| 8,813,551 B2 | 8/2014 | Boiarski |
| 8,827,924 B2 | 9/2014 | Paz et al. |
| 8,832,558 B2 | 9/2014 | Cardarelli et al. |
| 8,900,196 B2 | 12/2014 | Andino |
| 9,045,887 B2 | 6/2015 | O'Malley |
| 9,050,046 B2 | 6/2015 | Elliott et al. |
| 9,074,920 B2 | 7/2015 | Mendels et al. |
| 9,216,242 B2 | 12/2015 | Nishtala et al. |
| 9,480,821 B2 | 11/2016 | Ciccone et al. |
| 9,592,034 B2 | 3/2017 | Hall et al. |
| 9,642,987 B2 | 5/2017 | Bierman et al. |
| 9,731,097 B2 | 8/2017 | Andino et al. |
| 9,895,095 B2 | 2/2018 | Chen |
| 9,962,516 B2 | 5/2018 | Lampotang et al. |
| 10,182,747 B2 | 1/2019 | Charlez et al. |
| 10,245,008 B2 | 4/2019 | Paige |
| 10,362,981 B2 | 7/2019 | Paz et al. |
| 10,383,606 B1 | 8/2019 | McCord et al. |
| 10,448,875 B2 | 10/2019 | Holt et al. |
| 10,881,778 B2 * | 1/2021 | Scarpaci ............... A61M 1/155 |
| 11,703,365 B2 * | 7/2023 | Tourchak ............... G01F 1/56 73/861 |
| 2001/0056226 A1 | 12/2001 | Zodnik et al. |
| 2002/0016719 A1 | 2/2002 | Nemeth et al. |
| 2002/0161314 A1 | 10/2002 | Sarajarvi |
| 2002/0193760 A1 | 12/2002 | Thompson |
| 2003/0000303 A1 | 1/2003 | Livingston et al. |
| 2003/0163183 A1 | 8/2003 | Carson |
| 2003/0163287 A1 | 8/2003 | Vock et al. |
| 2004/0267086 A1 | 12/2004 | Anstadt et al. |
| 2005/0020958 A1 | 1/2005 | Paolini et al. |
| 2005/0065583 A1 | 3/2005 | Voorhees et al. |
| 2005/0172712 A1 | 8/2005 | Nyce |
| 2005/0247121 A1 | 11/2005 | Pelster |
| 2006/0100743 A1 | 5/2006 | Townsend et al. |
| 2007/0010797 A1 | 1/2007 | Nishtala et al. |
| 2007/0145137 A1 | 6/2007 | Mrowiec |
| 2007/0252714 A1 | 11/2007 | Rondoni et al. |
| 2008/0312556 A1 | 12/2008 | Dijkman |
| 2009/0056020 A1 | 3/2009 | Caminade et al. |
| 2009/0099629 A1 | 4/2009 | Carson et al. |
| 2009/0157430 A1 | 6/2009 | Rule et al. |
| 2009/0287170 A1 | 11/2009 | Otto |
| 2009/0315684 A1 | 12/2009 | Sacco et al. |
| 2010/0094204 A1 | 4/2010 | Nishtala |
| 2010/0130949 A1 | 5/2010 | Garcia |
| 2010/0137743 A1 | 6/2010 | Nishtala et al. |
| 2011/0113540 A1 | 5/2011 | Plate et al. |
| 2011/0120219 A1 | 5/2011 | Barlesi et al. |
| 2011/0178425 A1 | 7/2011 | Nishtala et al. |
| 2011/0224636 A1 | 9/2011 | Keisic |
| 2011/0238042 A1 | 9/2011 | Davis et al. |
| 2011/0251572 A1 | 10/2011 | Nishtala et al. |
| 2011/0263952 A1 | 10/2011 | Bergman et al. |
| 2012/0029408 A1 | 2/2012 | Beaudin |
| 2012/0059286 A1 | 3/2012 | Hastings et al. |
| 2012/0078137 A1 | 3/2012 | Mendels et al. |
| 2012/0078235 A1 | 3/2012 | Martin et al. |
| 2012/0095304 A1 | 4/2012 | Biondi |
| 2012/0109008 A1 | 5/2012 | Charlez et al. |
| 2012/0123233 A1 | 5/2012 | Cohen |
| 2012/0127103 A1 | 5/2012 | Qualey et al. |
| 2012/0226196 A1 | 9/2012 | DiMino et al. |
| 2012/0234434 A1 | 9/2012 | Woodruff et al. |
| 2012/0302917 A1 | 11/2012 | Fitzgerald et al. |
| 2012/0323144 A1 | 12/2012 | Coston et al. |
| 2012/0323502 A1 | 12/2012 | Tanoura et al. |
| 2013/0066166 A1 | 3/2013 | Burnett et al. |
| 2013/0109927 A1 | 5/2013 | Menzel |
| 2013/0109928 A1 | 5/2013 | Menzel |
| 2013/0131610 A1 | 5/2013 | Dewaele et al. |
| 2013/0218106 A1 | 8/2013 | Coston et al. |
| 2013/0245498 A1 | 9/2013 | Delaney et al. |
| 2013/0267871 A1 | 10/2013 | Delaney et al. |
| 2014/0039348 A1 | 2/2014 | Bullington et al. |
| 2014/0155781 A1 | 6/2014 | Bullington et al. |
| 2014/0155782 A1 | 6/2014 | Bullington et al. |
| 2014/0159921 A1 | 6/2014 | Qualey et al. |
| 2014/0207085 A1 | 7/2014 | Brandt et al. |
| 2014/0243635 A1 | 8/2014 | Arefieg |
| 2014/0335490 A1 | 11/2014 | Baarman et al. |
| 2015/0343173 A1 | 12/2015 | Tobescu et al. |
| 2015/0359522 A1 | 12/2015 | Recht et al. |
| 2015/0362351 A1 | 12/2015 | Joshi et al. |
| 2016/0051176 A1 | 2/2016 | Ramos et al. |
| 2016/0183819 A1 | 6/2016 | Burnett et al. |
| 2017/0100068 A1 | 4/2017 | Kostov |
| 2017/0136209 A1 | 5/2017 | Burnett et al. |
| 2017/0196478 A1 | 7/2017 | Hunter |
| 2017/0202698 A1 | 7/2017 | Zani et al. |
| 2017/0249445 A1 | 8/2017 | Devries et al. |

(56) References Cited

U.S. PATENT DOCUMENTS

| | | |
|---|---|---|
| 2017/0290540 A1 | 10/2017 | Franco |
| 2017/0291012 A1 | 10/2017 | Iglesias |
| 2017/0307423 A1 | 10/2017 | Pahwa et al. |
| 2018/0015251 A1 | 1/2018 | Lampotang et al. |
| 2018/0280236 A1 | 10/2018 | Ludin et al. |
| 2018/0344234 A1 | 12/2018 | Mckinney et al. |
| 2019/0046102 A1* | 2/2019 | Kushnir ................. G01F 23/20 |
| 2019/0069829 A1 | 3/2019 | Bulut |
| 2019/0069830 A1 | 3/2019 | Holt et al. |
| 2019/0126006 A1 | 5/2019 | Rehm et al. |
| 2019/0201596 A1 | 7/2019 | Luxon et al. |
| 2019/0223844 A1 | 7/2019 | Aboagye et al. |
| 2019/0247236 A1 | 8/2019 | Sides et al. |
| 2019/0321588 A1 | 10/2019 | Burnett et al. |
| 2019/0328945 A1 | 10/2019 | Analytis et al. |
| 2019/0358387 A1 | 11/2019 | Elbadry et al. |
| 2019/0365308 A1 | 12/2019 | Laing et al. |
| 2019/0381223 A1 | 12/2019 | Culbert et al. |
| 2020/0022637 A1 | 1/2020 | Kurzrock et al. |
| 2020/0085378 A1 | 3/2020 | Burnett et al. |
| 2020/0268303 A1 | 8/2020 | Oliva |
| 2020/0289749 A1 | 9/2020 | Odashima et al. |
| 2020/0405524 A1 | 12/2020 | Gill |
| 2021/0077007 A1 | 3/2021 | Jouret et al. |
| 2021/0299353 A1 | 9/2021 | Mannu et al. |
| 2022/0018692 A1 | 1/2022 | Tourchak et al. |
| 2022/0026261 A1* | 1/2022 | Funnell ................... G01F 23/20 |
| 2022/0192564 A1 | 6/2022 | Kriscovich et al. |
| 2022/0192565 A1 | 6/2022 | Cheng et al. |
| 2022/0192566 A1 | 6/2022 | Cheng et al. |
| 2022/0193375 A1 | 6/2022 | Rehm et al. |
| 2022/0233120 A1 | 7/2022 | Beuret et al. |
| 2022/0296140 A1 | 9/2022 | Nguyen et al. |
| 2022/0386917 A1 | 12/2022 | Mann et al. |
| 2023/0022547 A1 | 1/2023 | Cho et al. |
| 2023/0025333 A1 | 1/2023 | Patel et al. |
| 2023/0028966 A1 | 1/2023 | Franano |
| 2023/0035669 A1 | 2/2023 | Raja et al. |
| 2023/0040915 A1 | 2/2023 | Compton et al. |
| 2023/0058553 A1 | 2/2023 | Fallows et al. |
| 2023/0060232 A1 | 3/2023 | Patel et al. |
| 2023/0084476 A1 | 3/2023 | Robichaud et al. |
| 2024/0042120 A1 | 2/2024 | Cheng et al. |
| 2024/0081708 A1 | 3/2024 | Kelly et al. |
| 2024/0108268 A1 | 4/2024 | Woodard et al. |

FOREIGN PATENT DOCUMENTS

| | | |
|---|---|---|
| CN | 200951235 Y | 9/2007 |
| CN | 201492414 U | 6/2010 |
| CN | 102647939 A | 8/2012 |
| CN | 109498013 A | 3/2019 |
| CN | 110859636 A | 3/2020 |
| CN | 112426156 A | 3/2021 |
| EP | 0342028 A2 | 11/1989 |
| ES | 2760470 T3 | 5/2020 |
| GB | 2576743 A | 3/2020 |
| JP | S49-75171 A | 7/1974 |
| JP | S54-147066 A | 11/1979 |
| JP | S58-190719 A | 11/1983 |
| JP | S60-219517 A | 11/1985 |
| JP | H02-057240 B2 | 12/1990 |
| JP | H08-271301 A | 10/1996 |
| JP | H10-104041 A | 4/1998 |
| JP | 2007-303982 A | 11/2007 |
| JP | 2008-524618 A | 7/2008 |
| JP | 2009-068959 A | 4/2009 |
| JP | 2010-121950 A | 6/2010 |
| JP | 2010-530978 A | 9/2010 |
| JP | 2012-105947 A | 6/2012 |
| JP | 2012-225790 A | 11/2012 |
| WO | 1981003427 A1 | 12/1981 |
| WO | 2004045410 A1 | 6/2004 |
| WO | 2013013782 A2 | 1/2013 |
| WO | 20130178742 A1 | 12/2013 |
| WO | 2014/043650 A2 | 3/2014 |
| WO | 2014108690 A1 | 7/2014 |
| WO | 2014/135856 A1 | 9/2014 |
| WO | 2014/151068 A2 | 9/2014 |
| WO | 2014145971 A2 | 9/2014 |
| WO | 201511402 A1 | 1/2015 |
| WO | 2015/105916 A1 | 7/2015 |
| WO | 2015/127390 A1 | 8/2015 |
| WO | 2015191125 A1 | 12/2015 |
| WO | 2016177901 A1 | 11/2016 |
| WO | 2017/023794 A1 | 2/2017 |
| WO | 2018156624 A1 | 8/2018 |
| WO | 2019066357 A1 | 4/2019 |
| WO | 2019/226697 A1 | 11/2019 |
| WO | 2020033752 A1 | 2/2020 |
| WO | 2020154370 A1 | 7/2020 |
| WO | 2022108589 A1 | 5/2022 |
| WO | 2022182794 A1 | 9/2022 |
| WO | 2023022895 A1 | 2/2023 |
| WO | 2023027871 A1 | 3/2023 |

OTHER PUBLICATIONS

Bard Medical, Criticore Infection Control Disposables, 3 pages, www.bardmedical.com/patienl-moniloring-,ystems/criticore®-system/criticore®-infection-control-disposables/ Jan. 30, 2015.

Bard Medical, Criticore Monitor, 11 pages, www.bardmedical.com/products/patient-monitoring-systems/criticore®-monitor/ Jan. 30, 2015.

Bard Medical, Urine Meiers, 3 pages, www.bardmedical.com/products/urological-drainage/urine-collection/urinemeters/Jan. 30, 2015.

Biometrix, Urimetrix, 4 pages, www.biometrixmedical.com/Products/56/Urimetrix%E2%84%A2 Oct. 29, 2014.

Observe Medical, sippi, 3 pages, www.observemedical.com/products.html Oct. 29, 2014.

PCT/US19/33389 filed May 21, 2019 International Search Report and Written Opinion dated Aug. 2, 2019.

PCT/US2016/044835 filed Jul. 20, 2016 International Search Report and Written Opinion dated Dec. 16, 2016.

U.S. Appl. No. 17/054,493, filed Nov. 10, 2020 Final Office Action dated May 31, 2022.

U.S. Appl. No. 15/748,107, filed Jan. 26, 2018 Final Office Action dated Dec. 23, 2020.

U.S. Appl. No. 15/748,107, filed Jan. 26, 2018 Final Office Action dated Feb. 7, 2022.

U.S. Appl. No. 15/748,107, filed Jan. 26, 2018 Non-Final Office Action dated Sep. 3, 2021.

U.S. Appl. No. 15/748,107, filed Jan. 26, 2018 Non-Final Office Action dated Sep. 4, 2020.

U.S. Appl. No. 17/054,493, filed Nov. 10, 2020 Non-Final Office Action dated Nov. 24, 2021.

U.S. Appl. No. 15/748,107, filed Jan. 26, 2018 Notice of Allowance dated Dec. 12, 2022.

U.S. Appl. No. 17/054,493, filed Nov. 10, 2020 Non-Final Office Action dated Jan. 27, 2023.

U.S. Appl. No. 17/3026,821, filed May 3, 2021 Non-Final Office Action dated Jan. 10, 2023.

U.S. Appl. No. 17/373,535, filed Jul. 12, 2021 Non-Final Office Action dated Nov. 9, 2022.

U.S. Appl. No. 17/262,080, filed Jan. 21, 2021 Non-Final Office Action dated Apr. 6, 2023.

U.S. Appl. No. 17/373,535, filed Jul. 12, 2021 Notice of Allowance dated Feb. 23. 2023.

U.S. Appl. No. 17/556,907, filed Dec. 20, 2021 Restriction Requirement dated May 12, 2023.

PCT/US2019/045787 filed Aug. 8, 2019 International Preliminary Report on Patentability dated Feb. 16, 2021.

PCT/US2019/045787 filed Aug. 8, 2019 International Search Report and Written Opinion dated Oct. 2, 2019.

DFree Personal—Consumer Product Brochure, 2019.

DFree Pro Brochure 2019.

EP 23188337.2 filed May 21, 2019 Extended European Search Report dated Dec. 4, 2023.

(56) References Cited

OTHER PUBLICATIONS

Leonhäuser, D et al., "Evaluation of electrical impedance tomography for determination of urinary bladder volume: comparison with standard ultrasound methods in healthy volunteers."—BioMed Engr On-line; 17:95; 2018.

Li, R., et al., "Design of a Noninvasive Bladder Urinary Volume Monitoring System Based on Bio-Impedance."—Engineering; vol. 5; pp. 321-325; 2013.

PCT/US20/61367 filed Nov. 19, 2020 International Search Report and Written Opinion dated Feb. 22, 2021.

PCT/US2019/033389 filed Nov. 26, 2020 Extended European Search Report dated Jun. 4, 2021.

PCT/US2022/017574 filed Feb. 23, 2022 Internation Search Report and Written Opinion dated Jun. 8, 2022.

Reichmuth, M., et al., "A Non-invasive Wearable Bioimpedance System to Wirelessly Monitor Bladder Filling."—Dep. of Health Sciences and Technology—Department of Information Technology and Electrical Engineering ETH Zurich, Zurich, Switzerland—Conference Paper; Mar. 2020.

Schlebusch, T. et al., "Bladder vol. estimation from electrical impedance tomography" Physiological Measurement, Institute of Physics, Bristol, GB. vol. 35 No. 9 Aug. 20, 2014. (Aug. 20, 2014).

SECA product catalog, https://us.secashop.com/products/seca-mbca/seca-mbca-514/5141321139, last accessed Sep. 11, 2020.

U.S. Appl. No. 17/054,493, filed Nov. 10, 2020 Final Office Action dated Oct. 4, 2023.

U.S. Appl. No. 17/054,493, filed Nov. 10, 2020 Notice of Allowance dated Jan. 4, 2024.

U.S. Appl. No. 17/262,080, filed Jan. 21, 2021 Final Office Action dated Sep. 11, 2023.

U.S. Appl. No. 17/262,080, filed Jan. 21, 2021 Notice of Allowance dated Oct. 13, 2023.

U.S. Appl. No. 17/306,821, filed May 3, 2021 Advisory Action dated Oct. 3, 2023.

U.S. Appl. No. 17/306,821, filed May 3, 2021 Final Office Action dated Jul. 19, 2023.

U.S. Appl. No. 17/556,907, filed Dec. 20, 2021 Non-Final Office Action dated Aug. 17, 2023.

U.S. Appl. No. 17/556,907, filed Dec. 20, 2021 Notice of Allowance dated Dec. 6, 2023.

EP 20962628.2 filed May 31, 2023 Extended European Search Report dated Apr. 20, 2024.

U.S. Appl. No. 17/306,821, filed May 3, 2021 Notice of Allowance dated Apr. 23, 2024.

U.S. Appl. No. 17/556,931, filed Dec. 20, 2021 Non-Final Office Action dated Mar. 27, 2024.

U.S. Appl. No. 17/556,931, filed Dec. 20, 2021 Restriction Requirement dated Feb. 22, 2024.

\* cited by examiner

AUTOMATIC FLUID FLOW SYSTEM WITH RETRACTABLE CONNECTION

PRIORITY

This application claims the benefit of priority to U.S. Provisional Application No. 63/054,694, filed Jul. 21, 2020, which is incorporated by reference in its entirety into this application.

SUMMARY

Briefly summarized, embodiments disclosed herein are directed to automatic fluid flow system connectors and the like. In order to maintain a high accuracy of fluid flow monitoring, automatic fluid flow systems can determine a change in fluid volume by detecting a change in weight of a fluid collection system, over time. These detection systems rely on precise weight measurements to provide high accuracy of fluid flow in low-flow situations. As such, interface mechanisms configured to engage the fluid collection system with the automatic fluid flow system require a secure fit to ensure the downward forces, or changes thereof, are accurately transferred to the automatic fluid flow system. Further, the interface mechanisms must sustain repeated engagements and disengagements as different fluid collection systems are coupled/uncoupled to the automatic fluid flow system.

Disclosed herein is an automatic fluid flow measuring system including, a load cell having a first electrical contact disposed on a front surface of a plate, and transitionable along a transverse axis between an engaged position and a disengaged position, the transverse axis extending perpendicular to the front surface of the plate, and a ring connector configured to be coupled to a fluid collection system and including a second electrical contact disposed on a rear surface and configured to engage the first electrical contact in the engaged position, the ring connector configured to be releasably coupled to the load cell and transitionable between an unlocked position and a locked position.

In some embodiments, the load cell includes a biasing member configured to bias the plate towards the engaged position. In some embodiments, the ring connector engages the load cell along the transverse axis in the unlocked position and rotates about the transverse axis to the locked position. In some embodiments, one of the plate or the ring connector includes an alignment pin extending therefrom and configured to transition the plate from an engaged position to a disengaged position when the ring connector is coupled with the load cell in the unlocked position. In some embodiments, one of the ring connector or the load cell includes an alignment groove configured to receive the alignment pin in the locked position and to allow the plate to transition from the disengaged position to the engaged position.

In some embodiments, the load cell includes a flange extending radially and defining a first diameter, the ring connector including a recess configured to receive the flange therein. In some embodiments, the ring connector includes a tab extending radially inward from a rim of the recess to define a second diameter less than the first diameter, the flange including a slot configured to receive the tab therethrough in the unlocked position. In some embodiments, the tab is configured to rotate about the transverse axis to engage the flange in the locked position. In some embodiments, the automatic fluid flow measuring system further includes an O-ring extending annularly around one of the first electrical contact or the second electrical contact and configured to engage the ring connector and load cell in a locked position to provide a fluid tight seal therebetween. In some embodiments, the automatic fluid flow measuring system further includes a magnetic locking system configured to releasably couple the ring connector to the load cell.

Also disclosed is a method of measuring a fluid flow including, providing a load cell having a first electrical contact disposed on a plate, transitionable between a disengaged position and an engaged position, and a ring connector coupled to a fluid collection system and including a second electrical contact disposed within a recess, urging the ring connector along a transverse axis until the plate is disposed within the recess, rotating the ring connector about the transverse axis, transitioning the plate from a disengaged position to an engaged position, transferring a force from the ring connector to the load cell, and determining a fluid flow by determining a change in force over time.

In some embodiments, the force is transferred from the ring connector to the load cell along a second axis extending perpendicular to the transverse axis. In some embodiments, the first electrical contact engages the second electrical contact in the engaged position. In some embodiments, the first electrical contact engages the second electrical along the transverse axis. In some embodiments, the recess includes a tab extending radially inward and the load cell includes a flange extending radially outward, the flange including a slot configured to receive with the tab therethrough to allow the flange to be received within the recess along the transverse axis in an unlocked position. In some embodiments, rotating the ring connector engages the tab with the flange to releasably couple the ring connector to the load cell in a locked position. In some embodiments, the method further includes engaging an alignment pin with a surface of one of the recess or the plate to transition the plate from the engaged position to the disengaged position, the alignment pin extending from one of the plate or the recess. In some embodiments, the method further includes aligning the alignment pin with an alignment groove to transition the plate from the disengaged position to the engaged position. In some embodiments, the method further includes a biasing member configured to bias the plate to the engaged position.

DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which.

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.
Terminology Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Singular forms of "a," "an," and "the" include plural references unless the context clearly dictates otherwise.

In the following description, certain terminology is used to describe aspects of the invention. For example, in certain situations, the term "logic" is representative of hardware, firmware or software that is configured to perform one or more functions. As hardware, logic may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC," etc.), a semiconductor memory, or combinatorial elements.

Alternatively, logic may be software, such as executable code in the form of an executable application, an Application Programming Interface (API), a subroutine, a function, a procedure, an applet, a servlet, a routine, source code, object code, a shared library/dynamic load library, or one or more instructions. The software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM," power-backed RAM, flash memory, phase-change memory, etc.), a solid-state drive, hard disk drive, an optical disc drive, or a portable memory device. As firmware, the executable code may be stored in persistent storage.

The term "computing device" should be construed as electronics with the data processing capability and/or a capability of connecting to any type of network, such as a public network (e.g., Internet), a private network (e.g., a wireless data telecommunication network, a local area network "LAN", etc.), or a combination of networks. Examples of a computing device may include, but are not limited or restricted to, the following: a server, an endpoint device (e.g., a laptop, a smartphone, a tablet, a "wearable" device such as a smart watch, augmented or virtual reality viewer, or the like, a desktop computer, a netbook, a medical device, or any general-purpose or special-purpose, user-controlled electronic device), a mainframe, internet server, a router; or the like.

A "message" generally refers to information transmitted in one or more electrical signals that collectively represent electrically stored data in a prescribed format. Each message may be in the form of one or more packets, frames, HTTP-based transmissions, or any other series of bits having the prescribed format.

The term "computerized" generally represents that any corresponding operations are conducted by hardware in combination with software and/or firmware.

Figure 1A:
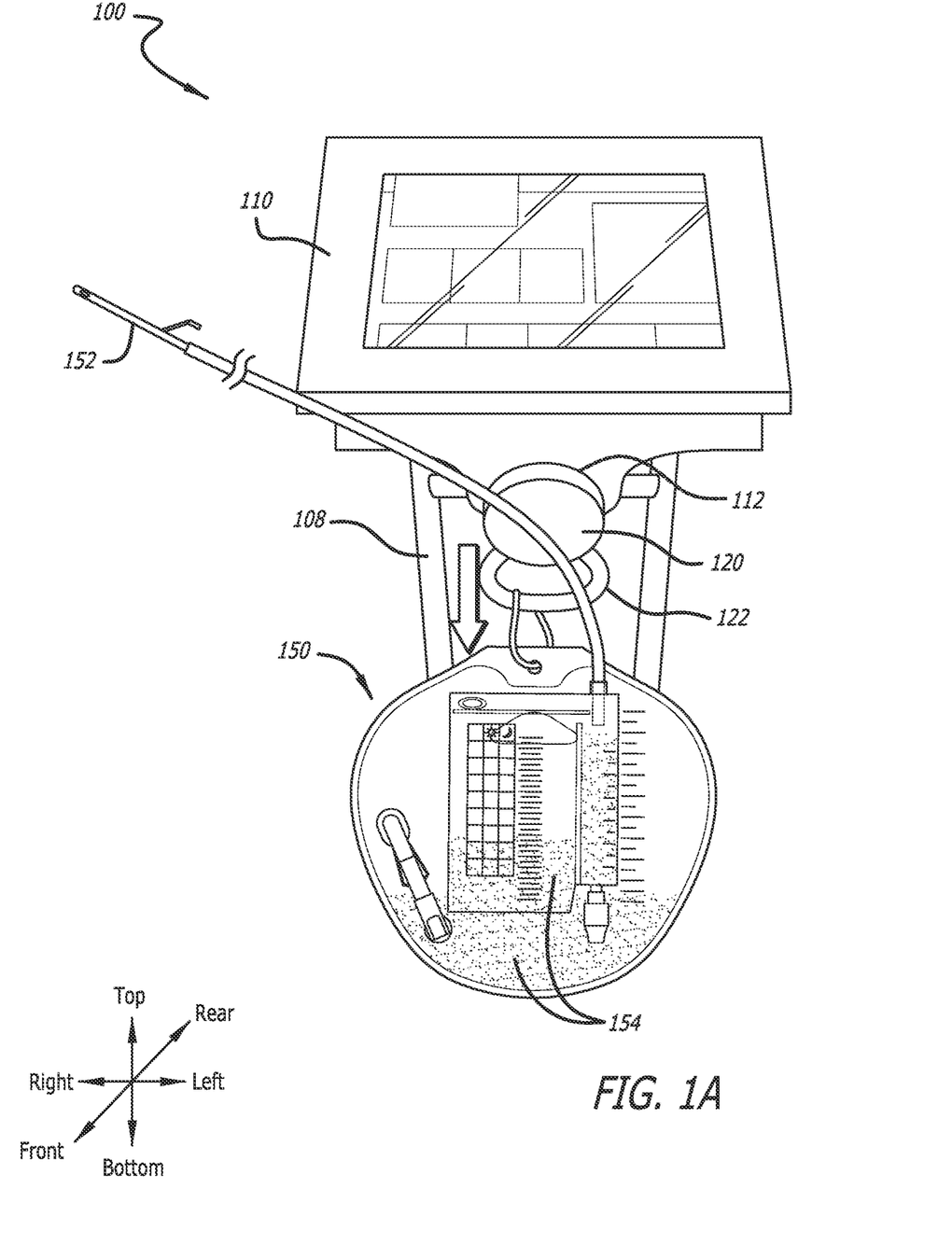
FIG. 1A shows a perspective view of an exemplary automatic fluid flow system including a fluid collection system, in accordance with embodiments disclosed herein.

Labels such as "left," "right," "upper", "lower," "top," "bottom," "front," "back," and the like are used for convenience and are not intended to imply, for example, any particular fixed location, orientation, or direction. Instead, such labels are used to reflect, for example, relative location, orientation, or directions. To assist in the description of embodiments described herein, the "top," "bottom," "left," "right," "front" and "back" directions are in reference to the orientation of the device as shown in FIG. 1A. A vertical axis extends between a top direction and a bottom direction. A lateral axis extends horizontally between a left direction and a right direction, substantially normal to the vertical axis. A transverse axis extends horizontally between a front direction and a back direction, substantially normal to both the vertical and lateral axes. A horizontal plane is defined by the lateral and transverse axes. A median plane is defined by the vertical and transverse axes. A frontal plane is defined by the vertical and lateral axes.

Unless defined otherwise, all technical and scientific terms used herein have the same meaning as commonly understood by those of ordinary skill in the art.

Figure 1B:
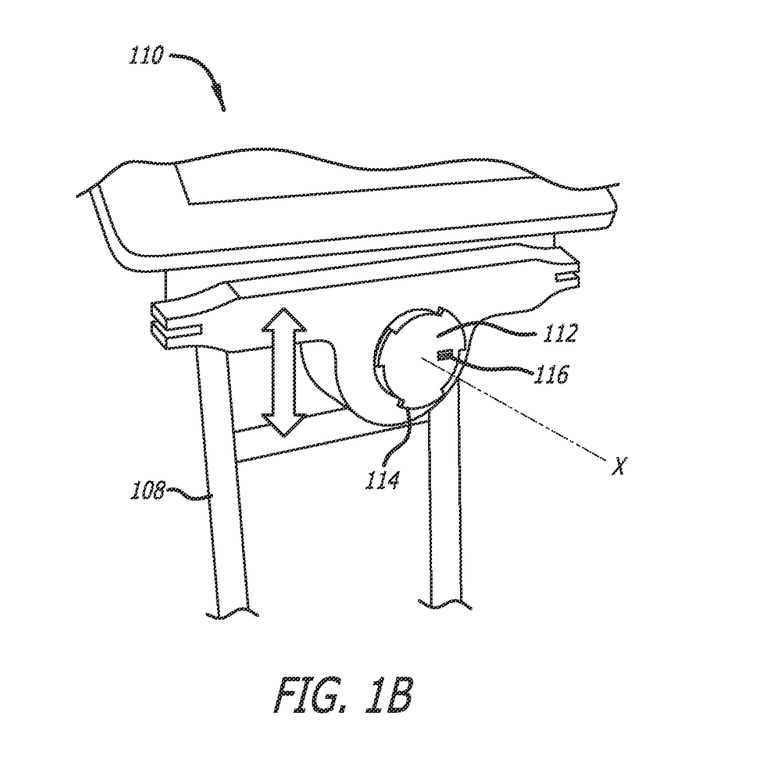
FIGS. 1B-1C show perspective views of a load cell interface and a ring connector of an exemplary automatic fluid flow system, in accordance with embodiments disclosed herein.
Figure 1C:
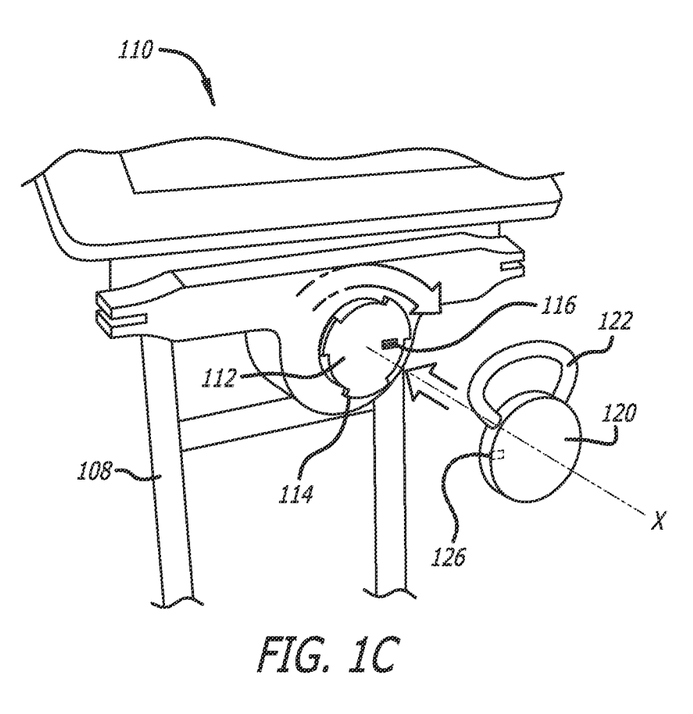

FIGS. 1A-1C show details of an exemplary automatic fluid flow measuring system ("system") 100 including a fluid collection system 150 coupled thereto, in accordance with embodiments disclosed herein. The automatic fluid flow system 100 generally includes a console 110 including a load cell interface ("load cell") 112 configured to engage a ring connector ("ring") 120. The ring connector 120 can include a loop 122, peg, hook, or similar structure from which a fluid collection system 150 can be suspended. The fluid collection system 150 can generally include one or more collection containers 154 in fluid communication with a catheter 152 or similar device configured to drain a fluid from a cavity of a patient. Optionally, the console 110 can be supported by a stand 108, or similar structure configured to support the console 110, ring 120, fluid collection system 150, and the like.

In an embodiment, the catheter 152 can be an internal catheter or an external catheter. Exemplary catheters can include external urinary catheter, internal urinary catheter, Foley catheter, balloon catheter, peritoneal catheters, or the like. Exemplary fluids collected can include urine, blood, peritoneal fluid, interstitial fluid, or the like. In an embodiment, the catheter 152 can be a Foley catheter configured to drain a fluid, e.g. urine, from a bladder of a patient.

As shown in FIG. 1B, the load cell interface 112 can be configured to detect a change in vertical movement relative to the console 110. In an embodiment, the load cell interface 112 can be configured to detect a force applied thereto, along an axis extending parallel to a front surface of the load cell 112, or perpendicular to a central transverse axis (x) of the load cell. For example, as shown in FIG. 1C, a ring connector 120 can be coupled to the load cell interface 112 by engaging the load cell 112 along the central transverse axis (x). The ring connector 120 can then be locked to the load cell 112 by rotating the ring connector 120 about the central transverse axis (x). In an embodiment, the ring connector 120 can be rotated between 5° and 360°. In an embodiment, the ring connector 120 can be rotated substantially 180°.

A fluid collection system 150 can then be coupled to the loop 122 of the ring connector 120. A change in fluid volume within the fluid collection system 150, and thereby a change in weight thereof, causes a change in force applied to the load cell interface 112. The change in force can be substantially along a vertical axis, however it will be appreciated that the load cell interface 112 can detect force changes along other axes in three-dimensional space, as well. The change in force applied to the load cell interface 112 can be detected by the console 110 to determine a change in fluid volume within the fluid collection system 150. This information can then be stored, analyzed, displayed, or communicated to one or more external computing devices or networks, e.g. an Electronic Health Record (EHR) system, network, or the like.

In an embodiment, the load cell interface 112 can include a locking mechanism 114 and an electrical contact interface 116. The locking mechanism 114 can be configured to engage a corresponding locking mechanism disposed on the ring connector 120 to secure the ring connector 120 to the load cell interface 112, as described in more detail herein. As noted, the locking mechanism 114 can be a rotational locking mechanism 114 where the ring connector 120 is rotated through a frontal plane by substantially 180° to transition the ring connector between a locked configuration (FIG. 1A) and an unlocked configuration (FIG. 1C).

In an embodiment, the electrical contact interface 116 can be configured to engage a corresponding electrical contact interface 126 disposed on the ring connector 120 to communicatively couple the ring connector 120 to the load cell interface 112 of the console 110. In an embodiment, the ring connector electrical contact interface 126 engages the load cell electrical contact interface 116 in one of the locked configuration or the unlocked configuration.

In an embodiment, the ring connector 120 can include one or more processors, memory, storage logic, communication logic, or the like, configured to store information and communicate with the console 110 by way of the ring connector electrical contact interface 126 and the load cell electrical contact interface 116. For example, the ring connector 120 can store fluid flow information, system information, patient information, or the like. Fluid flow information can include current or historical fluid volume information, fluid flow information (i.e. change in volume over time), combinations thereof or the like. System information can include the make, model, serial number, etc. of the ring connector 120, fluid collection system 150, the console 110, components thereof, or the like. Patient information can include height, weight, blood pressure, etc. of the patient, or similar health record information.

Advantageously, the fluid flow information, system information, patient information, and the like, can be stored to the ring connector 120 and transported with the collection system 150 and patient. The ring connector 120 and collection system 150 assembly can then be coupled to a different console 110, e.g. during transport or console malfunction, and continue to measure fluid flow without losing the historical data, or transferring the data separately. As such, the data remains with the patient and the collection system 150 and is not lost.

FIGS. 2A-2G show embodiments of a load cell interface 212 and a ring connector 220 including a retractable plate locking mechanism 214 configured to releasably engage the ring connector 220 with the load cell 212. The load cell 212 can define a front surface, a rear surface and a side surface extending therebetween. The ring connector 220 can define a front surface, a rear surface and a side surface extending therebetween. To note, while one of the load cell 212 or the ring connector 220 can define a circular shaped front surface or rear surface, it will be appreciated that other closed curve, regular or irregular polygonal shapes are also contemplated including triangular, square, hexagonal, or the like.

Figure 2A:
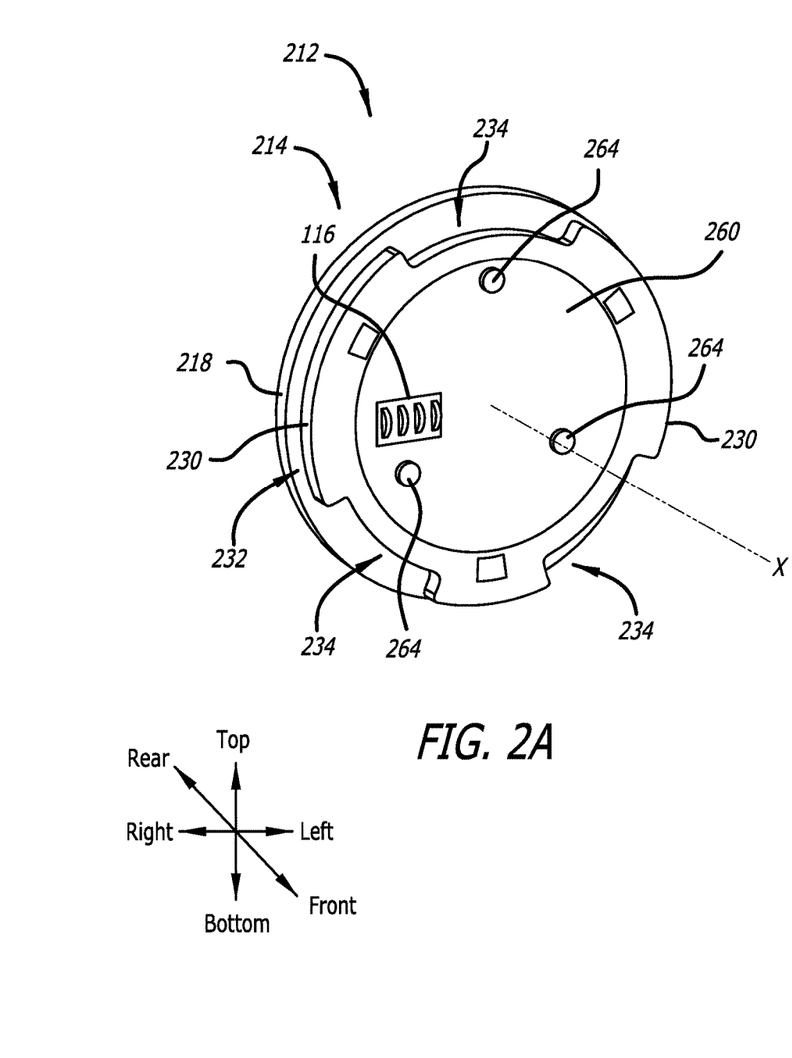
FIG. 2A shows a perspective view of a load cell interface, in accordance with embodiments disclosed herein.
Figure 2B:
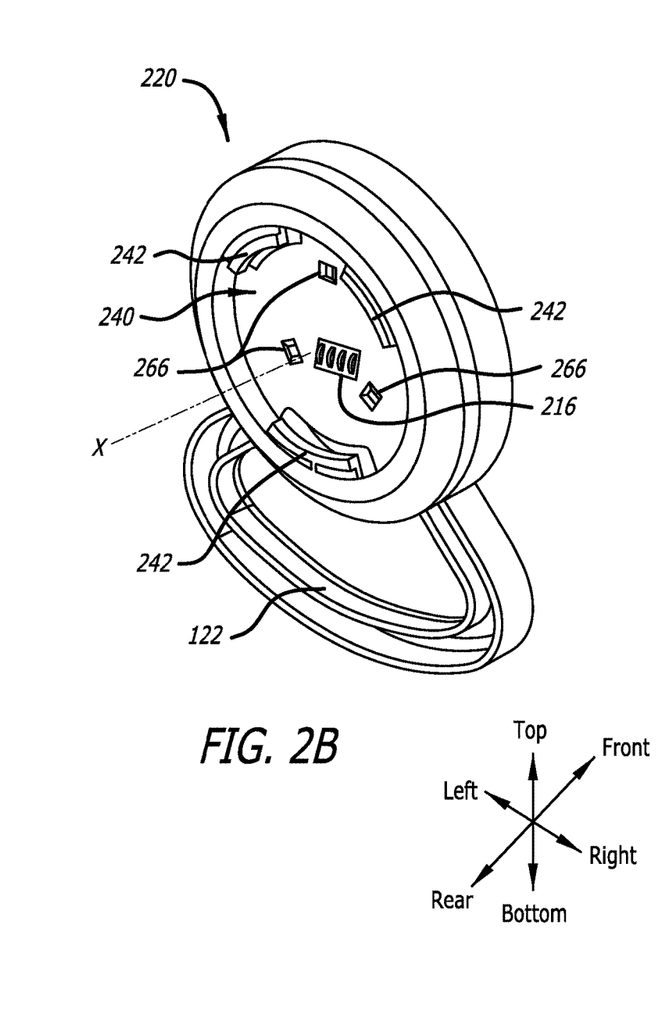
FIG. 2B shows a perspective view of a ring connector, in accordance with embodiments disclosed herein.
Figure 2C:
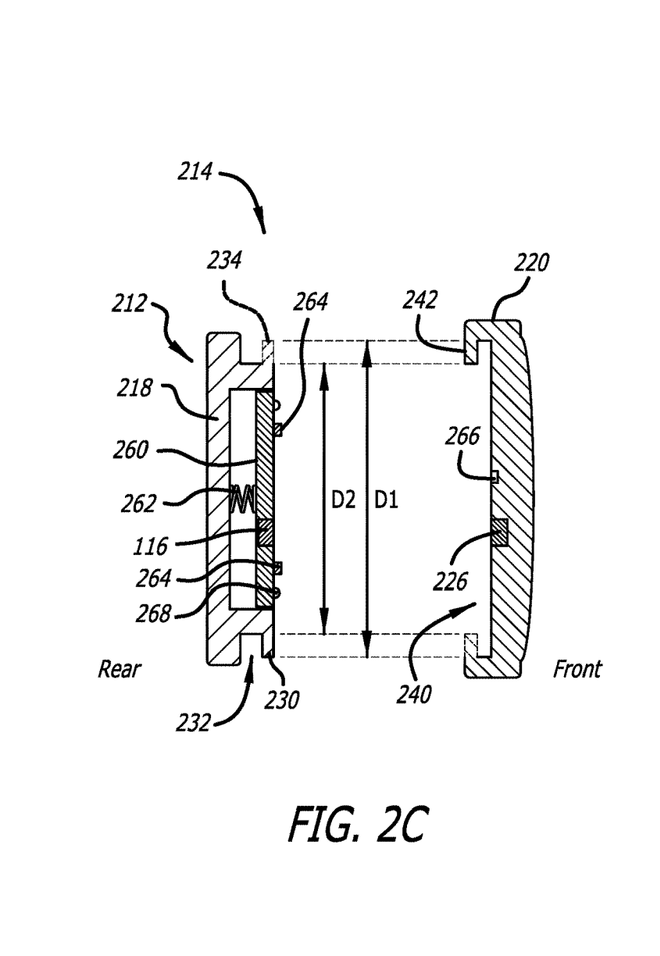
FIG. 2C shows a cross-section view of a ring connector and a load cell interface in an uncoupled position, in accordance with embodiments disclosed herein.
Figure 2D:
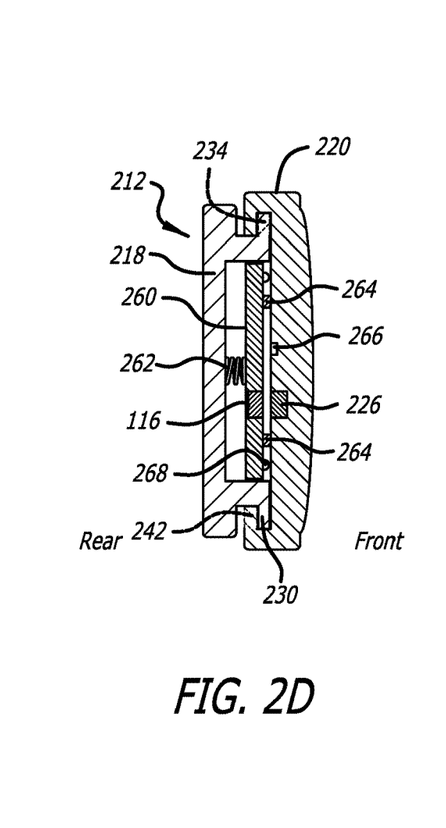
FIG. 2D shows a cross-section view of a ring connector coupled to a load cell interface in an unlocked position, in accordance with embodiments disclosed herein.
Figure 2E:
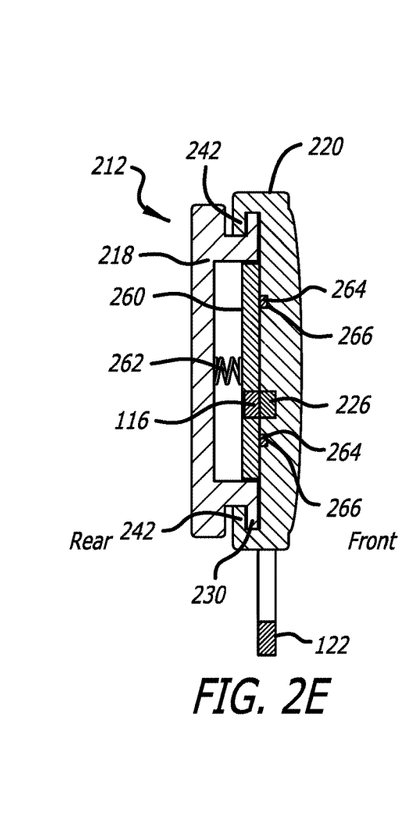
FIG. 2E shows a cross-section view of a ring connector coupled to a load cell interface in a locked position, in accordance with embodiments disclosed herein.

In an embodiment, the retractable plate locking mechanism 214 can include a bayonet engagement mechanism having a movable plate 260 transitionable between an unlocked position (FIG. 2D) and a locked position (FIG. 2E). As shown in FIGS. 2A and 2C, the load cell 212 can include a flange 230 extending radially from a central transverse axis (x), substantially parallel to a front surface of the load cell 212, and extending annularly about the front surface of the load cell 212. The flange 230 can define a track 232 extending annularly, between the flange 230 and a body 218 of the load cell 212. The flange 230 can define a first diameter (D1), and the track 232 can define a second diameter (D2) which is less than the first diameter (D1). The flange 230 can include one or more slots 234 extending transversely through the flange 230 and configured to allow access to the track 232, as described in more detail herein.

In an embodiment, the rear surface of the ring connector 220 can include a recess 240 configured to receive the flange 230 therein. The recess 240 can define a diameter that is substantially equal to, or greater than, the first diameter (D1). The recess 240 can further include one or more tabs 242 extending radially inward from a rim of the recess 240. A diametric distance between the inner edge of the tabs 242 can be equal to, or slightly larger than, the second diameter (D2) of the track 232 and can be less than the first diameter (D1). In an embodiment, the tab(s) 242 can align with the slot(s) 234 along a transverse axis to allow the flange 230 to be received within the recess 240 (FIG. 2D). The ring connector 220 can then be rotated about the central transverse axis (x) until the tab 242 engages the flange 230 in a bayonet fit engagement, securing the ring connector 220 to the load cell 212 in a locked position (FIG. 2E).

As such, the load cell 212 includes a male bayonet connection and the ring connector 220 includes a female bayonet connection. It will be appreciated, however, that embodiments can further include the load cell 212 with a female bayonet connection and the ring connector 220 with a male bayonet connection without departing from the spirit of the invention.

Figure 2F:
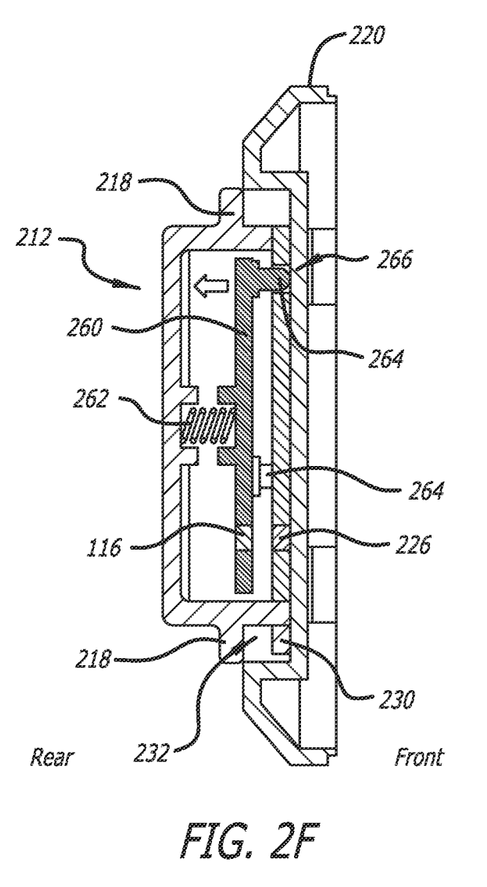
FIG. 2F shows a cross-section view of a ring connector coupled with a load cell interface in an unlocked position, in accordance with embodiments disclosed herein.

In an embodiment, as shown in FIGS. 2C-2G, the load cell 212 includes a retractable plate ("plate") 260 that is slidably engaged with the load cell 212 along a transverse axis between an engaged position (FIGS. 2C, 2E, 2G) and a disengaged position (FIGS. 2D, 2F). As noted, while embodiments as shown include the load cell 212 having the plate 260 it will be appreciated that embodiments can include the ring connector 220 having the retractable plate 260 without departing from the spirit of the invention.

Figure 2G:
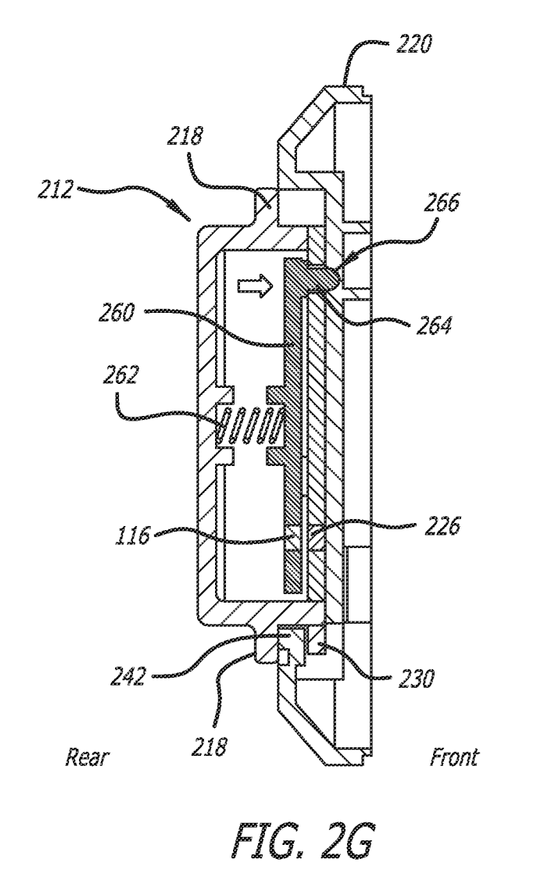
FIG. 2G shows a cross-section view of a ring connector coupled with a load cell interface in a locked position, in accordance with embodiments disclosed herein.

In an embodiment, the load cell 212 can further include a biasing member 262, e.g. a compression spring or the like, configured to bias the plate 260 towards an engaged position (FIGS. 2C, 2E, 2G). In an embodiment, the load cell 212 can include an electrical contact 116 disposed on the front surface of the plate 260. The plate 260 can further include one or more alignment pins 264 extending from the front surface of the plate 260. The ring connector 220 can include one or more alignment grooves 266 disposed in a rear surface of the ring connector 220, e.g. within the recess 240, and each configured to receive an alignment pin 264 therein. The alignment grooves 266 can further include a chamfered edge to facilitate engagement or disengagement of the alignment pin 264 therefrom.

The alignment grooves 266 can be configured to align with the alignment pins 264 when the ring connector 220 is in the locked position (FIGS. 2E, 2G). Similarly, the alignment grooves 266 can be configured to be misaligned with the alignment pins 264 when the ring connector 220 is in the unlocked position (FIGS. 2D, 2F). In an embodiment, the tab(s) 242 can align with the slot(s) 234 to allow the flange 230 to be received within the recess 240 in an unlocked position. As such, the alignment pins 264, which are misaligned with the alignment grooves 266 in this position, engage with a surface of the ring connector 220, e.g. a surface of the recess 240 and transition the plate 260 from the engaged position (FIG. 2C) to the disengaged position (FIG. 2D). The ring connector 220 can then be rotated about the central transverse axis (x) from the unlocked position (FIGS. 2D, 2F) where the tabs 242 align with the slots 234, to a locked position (FIGS. 2E, 2G) where the tabs 242 engage the flange 230. In the locked position, the alignment pins 264 align with the alignment grooves 266 to allow the biasing member 262 to transition the plate 260 from the disengaged position (FIGS. 2D, 2F) to the engaged position (FIGS. 2E, 2G). This allows the load cell electrical contacts 116 to engage the ring connector electrical contacts 226 along a transverse axis as the ring connector 220 is rotated to the locked position.

In like manner, to disengage the ring connector 220 from the load cell 212, the ring connector 220 can be rotated about the central transverse axis (x) from the locked position (FIGS. 2E, 2G) where the tabs 242 engage the flange 230, to the unlocked position (FIGS. 2D, 2G), where the tabs 242 align with the slots 234. As the ring connector 220 is rotated, the alignment pins 264 disengage the alignment grooves 266 and transition the plate 260 from the engaged position to the disengaged position, disengaging the load cell electrical contacts 116 from the ring connector electrical contacts 126 along the transverse axis. The ring connector 220 can then be uncoupled from the load cell 212 by withdrawing the ring connector 220 along the central transverse axis (x). The biasing member 262 can then reset the plate 260, transitioning the plate 260 to the engaged the position.

Advantageously, the retractable plate locking mechanism 214 prevents the electrical contacts 116, 226 from dragging over each other, i.e. along an axis extending perpendicular to the transverse axis, as the ring connector 220 is rotated between the locked position and the unlocked position. Instead the electrical contacts 116, 226 engage along the transverse axis that extends perpendicular to the front surface of the load cell 212, or the rear surface of the ring connector 220 on which the electrical contacts 116, 226 are disposed. Worded differently, the electrical contacts 116, 226 engage along the transverse axis that extends perpendicular to a direction of rotation and mitigates wear and damage to the electrical contacts 116, 226 extending the usable life of the system 100.

In an embodiment, one of the ring connector 220 or the load cell 212 can include an O-ring 268 or similar grommet extending annularly along an edge of the plate 260 or recess 240 and configured to encircle the electrical contacts 116, 226 when in the locked position. In an embodiment, the O-ring 268 extends annularly along a front surface of the plate 260 and can engage a surface of the recess 240 of the ring connector 220 when in the locked configuration. However, it will be appreciated that other configurations of the O-ring 268 are also contemplated. Advantageously, the O-ring 268 can engage the ring connector 220 and the load cell 212 in the locked position and provide a fluid-tight seal therebetween. This prevents any fluid from accessing the electrical contacts 116, 226, and causing a short-circuit, or similar damage to the system 100.

While embodiments disclosed herein show a retractable plate locking mechanism 214 including a bayonet locking mechanism, it will be appreciated that the retractable plate locking mechanism 214 can include other locking mechanisms configured to secure the ring connector 220 to the load cell 212 without departing from the spirit of the invention. For example, the ring connector 220 can be secured to the load cell 212 by a magnetic system, e.g. permanent magnet, electromagnet, or the like and rotated as described herein to engage or disengage the plate 260. These and similar locking mechanisms are contemplated to fall within the scope of the present invention.

In an exemplary method of use, a load cell 212 and a ring connector 220 including a retractable plate locking mechanism 214 can be provided, as described herein. A user can align the tabs 242 of the ring connector 220 with the slots 234 of the flange 230 and urge the ring connector 220 along a central transverse axis (x) to couple the ring connector 220 with the load cell 212. As the flange 230 is received into the recess 240, the alignment pins 264, which are misaligned with the alignment grooves 266, engage the rear surface of the ring connector 220 and transition the plate 260 from the engaged position to the disengaged position. Advantageously this prevents the load cell electrical contacts 116 from engaging a rear surface of the ring connector 220, recess 240, or the like, and being dragged thereover as the ring connector 220 is rotated. This prevents damage and wear to the load cell electrical contacts 116 prolonging the usable life of the system 100.

The ring connector 220 can then be rotated to a locked position, by rotating the ring connector about the central transverse axis (x) until a tab 242 engages the flange 230 and an alignment pin 264 aligns with an alignment groove 266 allowing the biasing member 262 to transition the plate 260 from the disengaged position to the engaged position. This allows the load cell electrical contacts 116 to engage the ring connector electrical contacts 226 along the transverse axis communicatively coupling the ring connector 220 with the load cell 212.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. An automatic fluid flow measuring system configured to detect a change in weight of a fluid collection system over time, comprising:
a load cell extending from a front surface of a console and configured to detect a downward force applied thereto, the load cell including a first electrical contact disposed on a front surface of a plate of the load cell, the plate transitionable relative to the load cell along a transverse axis between an engaged position and a disengaged position, the transverse axis extending perpendicular to the front surface of the plate; and
a ring connector configured to be coupled to the fluid collection system and including a second electrical contact disposed on a rear surface and configured to engage the first electrical contact in the engaged position, the ring connector configured to be releasably coupled to the load cell and rotatable between an unlocked position and a locked position.

2. The automatic fluid flow measuring system according to claim 1, wherein the load cell includes a biasing member configured to bias the plate towards the engaged position.

3. The automatic fluid flow measuring system according to claim 1, wherein the ring connector engages the load cell along the transverse axis in the unlocked position and rotates about the transverse axis to the locked position.

4. The automatic fluid flow measuring system according to claim 1, wherein one of the plate or the ring connector includes an alignment pin extending therefrom and configured to transition the plate from the engaged position to the disengaged position when the ring connector is coupled with the load cell in the unlocked position.

5. The automatic fluid flow measuring system according to claim 4, wherein one of the ring connector or the load cell includes an alignment groove configured to receive the alignment pin in the locked position and to allow the plate to transition from the disengaged position to the engaged position.

6. The automatic fluid flow measuring system according to claim 1, wherein the load cell includes a flange extending radially and defining a first diameter, the ring connector including a recess configured to receive the flange therein.

7. The automatic fluid flow measuring system according to claim 6, wherein the ring connector includes a tab extending radially inward from a rim of the recess to define a second diameter less than the first diameter, the flange including a slot configured to receive the tab therethrough in the unlocked position.

8. The automatic fluid flow measuring system according to claim 7, wherein the tab is configured to rotate about the transverse axis to engage the flange in the locked position.

9. The automatic fluid flow measuring system according to claim 1, further including an O-ring extending annularly around one of the first electrical contact or the second electrical contact and configured to engage the ring connector and the load cell in the locked position to provide a fluid tight seal therebetween.

10. The automatic fluid flow measuring system according to claim 1, further including a magnetic locking system configured to releasably couple the ring connector to the load cell.

11. A method of measuring a fluid flow by detecting a change in weight of a fluid collection system, over time, and comprising:
providing a load cell configured to detect a downward force applied thereto and including a first electrical contact disposed on a plate of the load cell, the plate transitionable relative to the load cell between a disengaged position and an engaged position, and a ring connector coupled to the fluid collection system and including a second electrical contact disposed within a recess;
urging the ring connector along a transverse axis until the plate is disposed within the recess;
rotating the ring connector about the transverse axis to engage the load cell;
transitioning the plate from the disengaged position to the engaged position;
transferring the downward force from the ring connector to the load cell; and
determining the fluid flow by determining a change in the downward force over time.

12. The method according to claim 11, wherein the downward force is transferred from the ring connector to the load cell along a second axis extending perpendicular to the transverse axis.

13. The method according to claim 11, wherein the first electrical contact engages the second electrical contact in the engaged position.

14. The method according to claim 11, wherein the first electrical contact engages the second electrical contact along the transverse axis.

15. The method according to claim 11, wherein the recess includes a tab extending radially inward and the load cell includes a flange extending radially outward, the flange including a slot configured to receive the tab therethrough to allow the flange to be received within the recess along the transverse axis in an unlocked position.

16. The method according to claim 15, wherein rotating the ring connector engages the tab with the flange to releasably couple the ring connector to the load cell in a locked position.

17. The method according to claim 11, further including engaging an alignment pin with a surface of one of the recess or the plate to transition the plate from the engaged position to the disengaged position, the alignment pin extending from one of the plate or the recess.

18. The method according to claim 17, further including aligning the alignment pin with an alignment groove to transition the plate from the disengaged position to the engaged position.

19. The method according to claim 11, further including a biasing member configured to bias the plate to the engaged position.

* * * * *